(12) United States Patent
Ohashi et al.

(10) Patent No.: US 8,481,198 B2
(45) Date of Patent: Jul. 9, 2013

(54) WOUND ELECTROCHEMICAL DEVICE AND METHOD OF MANUFACTURING SAME

(75) Inventors: Yoshihiko Ohashi, Tokyo (JP); Mitsuo Kougo, Tokyo (JP); Kiyonori Hinoki, Tokyo (JP); Kazuo Katai, Tokyo (JP)

(73) Assignee: TDK Corporation, Tokyo (JP)

( * ) Notice: Subject to any disclaimer, the term of this patent is extended or adjusted under 35 U.S.C. 154(b) by 1245 days.

(21) Appl. No.: 12/332,031

(22) Filed: Dec. 10, 2008

(65) Prior Publication Data

US 2009/0169993 A1    Jul. 2, 2009

(30) Foreign Application Priority Data

Dec. 27, 2007 (JP) ................. P2007-337381

(51) Int. Cl.
*H01M 2/00* (2006.01)

(52) U.S. Cl.
USPC ........................ 429/163; 429/122; 429/164

(58) Field of Classification Search
USPC ....................................................... 429/163
See application file for complete search history.

(56) References Cited

U.S. PATENT DOCUMENTS

| 6,616,714 | B1 | 9/2003 | Gauthier et al. | |
| 2005/0277023 | A1* | 12/2005 | Marple et al. | 429/221 |
| 2006/0105233 | A1* | 5/2006 | Morita | 429/162 |

FOREIGN PATENT DOCUMENTS

| EP | 0 987 782 A2 | 3/2000 |
| JP | A-2000-67907 | 3/2000 |
| JP | A-2001-313062 | 11/2001 |
| JP | A-2001-345115 | 12/2001 |
| JP | A-2003-45474 | 2/2003 |
| JP | A-2003-109869 | 4/2003 |
| JP | A-2003-346883 | 12/2003 |
| JP | 2005129383 A * | 5/2005 |
| JP | A-2005-129383 | 5/2005 |
| JP | A-2006-286431 | 10/2006 |
| JP | A-2007-194130 | 8/2007 |

* cited by examiner

*Primary Examiner* — Barbara Gilliam
*Assistant Examiner* — Gary Harris
(74) *Attorney, Agent, or Firm* — Oliff & Berridge, PLC (57) ABSTRACT

A wound electrochemical device has a wound body formed by winding a multilayer member including a multilayer structure composed of a positive electrode, a separator, and a negative electrode; wherein each of the positive and negative electrodes, includes a structure having an active material layer formed on both sides of a current collector; wherein the wound body has a space at a center portion thereof; and wherein the smallest radius of curvature R of a curved part in an innermost circumferential portion of the wound body satisfies the following expression (1):

$$R = \alpha \times (T_1 + 2T_2) \qquad (1)$$

where R is the smallest radius of curvature of the curved part in the innermost circumferential portion of the wound body (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

3 Claims, 7 Drawing Sheets

WOUND ELECTROCHEMICAL DEVICE AND METHOD OF MANUFACTURING SAME

BACKGROUND OF THE INVENTION

1. Field of the Invention

The present invention relates to a wound electrochemical device and a method of manufacturing the same.

2. Related Background Art

Conventionally known wound electrochemical devices include those of a type using an elliptical or flat ""planar wound body" formed by flatly winding a long electrode (see Japanese Patent Application Laid-Open Nos. 2007-194130, 2006-286431, 2000-67907, and 2001-345115). In this type, the flat portion realizes a multilayer structure of electrodes, while bent portions formed upon winding can keep a mechanical strength of the electrodes and suppress deformations thereof. They have a flat form after winding and thus are advantageous in terms of space for use. However, it is necessary for electrodes to connect with leads having a specific thickness, which makes them hard to attain a significantly flat form.

For such a problem, in order to securely attain a flat form, it has been proposed to provide an inwardly convex structure at the center portion of the wound body, thereby absorbing bulges caused by the leads (see Japanese Patent Application Laid-Open No. 2003-109869).

SUMMARY OF THE INVENTION

However, the inventors have found that, when a space is provided at the center portion of the wound body as described in the above-mentioned Japanese Patent Application Laid-Open No. 2003-109869, mechanical stresses caused by deformations in the space may be applied to parts (i.e., curved parts of the electrodes) securing the space, thereby adversely affecting characteristics of the electrochemical device themselves.

When a current collector or active material layer forming the electrodes is thin in particular, the electrodes tend to succumb to mechanical stresses exerted on the curved parts of the wound body, thereby chipping and fracturing, which may cause the electrochemical device to decrease its capacity, or incur distortions in the wound body and fail to attain a flat form.

In view of the problems in the prior art mentioned above, it is an object of the present invention to provide a thin wound electrochemical device having a flat form after winding and a sufficient capacity, and a method of manufacturing the same.

For achieving the above-mentioned object, the present invention provides a wound electrochemical device having a flat wound body formed by winding a multilayer member including a multilayer structure composed of a positive electrode, a separator, and a negative electrode; wherein each of the positive and negative electrodes includes a structure having an active material layer formed on both sides of a current collector; wherein the wound body has a space at a center portion thereof; and wherein the smallest radius of curvature R of a curved part in an innermost circumferential portion of the wound body satisfies the following expression (1):

$$R = \alpha \times (T_1 + 2T_2) \quad (1)$$

where R is the smallest radius of curvature of the curved part in the innermost circumferential portion of the wound body (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

Since this wound electrochemical device has a space at the center portion of the wound body, while the smallest radius of curvature R of the curved part in the innermost circumferential portion defining the space satisfies the relational expression mentioned above, mechanical stresses to an electrode in a curved part can be suppressed to a level endurable by the thickness of the current collector and active material layer in this electrode, which prevents fractures and chips from occurring upon bending the electrode, whereby a flat form without distortions can be obtained with a sufficient capacity.

One of the characteristic features of the wound electrochemical device in accordance with the present invention lies in that the thickness ($T_2$) of the active material layer in the electrode positioned at the innermost circumference of the wound body is thinner than that in conventional wound electrochemical devices. When a wound electrochemical device is formed by using such a thin electrode, the electrode is likely to chip or fracture at curved parts of the wound body. Therefore, a multilayer electrochemical device structure in which planar electrodes are laminated is employed in general. In the present invention, by contrast, the smallest radius of curvature R in the curved part satisfies the above-mentioned relationship when a thin electrode is used, thereby restraining the electrode from chipping and fracturing in the curved parts of the wound body, so that a thin wound electrochemical device having a sufficient capacity can be obtained.

Preferably, in a cocoon form drawn by a center line of the current collector of the electrode positioned at the innermost circumference of the wound body in a cross section of the wound body cut by a plane parallel to a side face thereof; letting a point A be a contact point between a first line parallel to a shorter axis direction of the wound body and a curved part in the cocoon form; assuming that a second line is a line parallel and closest to the first line while intersecting the cocoon form by two points on the first line side of a winding start portion of the wound body and yielding the longest distance between the two points, and letting points B and C be the two intersections between the second line and the cocoon form; letting a point O be an intersection between the second line and a line passing the point A while being perpendicular to the first line; and letting $D_0$ be the distance OA (unit: μm), $D_1$ be the distance OB (unit: μm), and $D_2$ be the distance OC (unit: μm); each of values ($D_0$-$D_1$) and ($D_0$-$D_2$) is within ±5 μm.

The values ($D_0$-$D_1$) and ($D_0$-$D_2$) represent degrees of uniformity in a curved part in the wound body. The greater these values are, the more irregular the form of the curved part becomes. When the form of the curved part is irregular, mechanical stresses are likely to apply thereto locally, thereby causing the electrode to fracture and chip. When each of the values ($D_0$-$D_1$) and ($D_0$-$D_2$) is kept within the range of ±5 μm, mechanical stresses exerted on the curved part are sufficiently homogenized, whereby the electrode can more fully be restrained from fracturing and chipping.

The present invention also provides a method of manufacturing a wound electrochemical device, the method comprising a multilayer member preparing step of preparing a multilayer member including a multilayer structure composed of a positive electrode, a separator, and a negative electrode; and a winding step of winding the multilayer member about a core material having a cross section in a cocoon form, so as to form a flat wound body; wherein the smallest radius of curvature $R_0$ in a curved part in the cocoon form in the core material satisfies the following expression (2):

$$R_0 = \alpha \times (T_1) + 2T_2) \qquad (2)$$

where $R_0$ is the smallest radius of curvature of the curved part in the cocoon form (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

By using a core material in which the smallest radius of curvature $R_0$ in the curved part satisfies the relational expression mentioned above, the method of manufacturing an electrochemical device can manufacture the above-mentioned wound electrochemical device efficiently and reliably. Winding the electrode about the above-mentioned core material allows the smallest radius of curvature R in the curved part in the innermost circumferential portion to satisfy the condition of the above-mentioned expression (1) after the core material is pulled out. Therefore, the method of manufacturing a wound electrochemical device in accordance with the present invention can restrain thin electrodes from fracturing and chipping upon bending at curved parts of the wound body, and thus can yield a wound electrochemical device having a sufficient capacity and a flat form without distortions.

As in the foregoing, the present invention can provide a thin wound electrochemical device having a flat form after winding and a sufficient capacity, and a method of manufacturing the same.

DESCRIPTION OF THE PREFERRED EMBODIMENTS

In the following, preferred embodiments of the present invention will be explained in detail with reference to the accompanying drawings. In the drawings, identical or equivalent parts will be referred to with the same numerals or letters while omitting their overlapping explanations. Positional relationships such as those of upper, lower, left, and right are based on those shown in the drawings unless otherwise specified. Ratios of dimensions in the drawings are not limited to those depicted.

Wound Electrochemical Device

Figure 1:
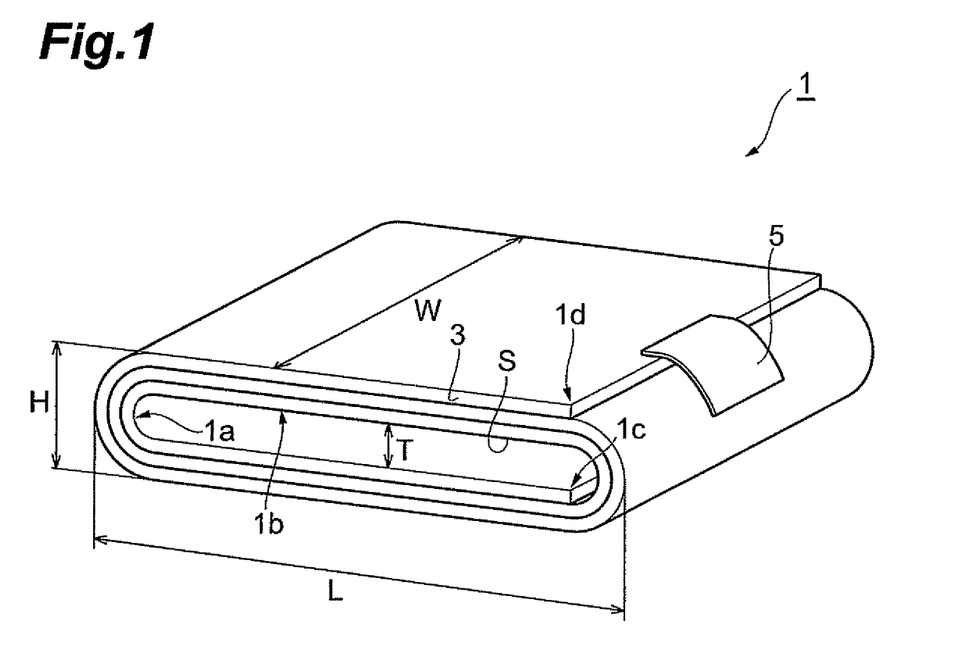
FIG. 1 is a perspective view showing an embodiment of a wound body constituting the wound electrochemical device of the present invention.

The wound electrochemical device in accordance with a preferred embodiment of the present invention has a flat wound body formed by winding a multilayer member including a multilayer structure composed of a positive electrode, a separator, and a negative electrode. Here, FIG. 1 is a perspective view showing an embodiment of the wound body constituting the wound electrochemical device. As shown in FIG. 1, the wound body 1 has a structure in which a band-like multilayer member 3 is wound flatly from a winding start portion 1c to a winding end portion 1d held with a winding stop tape 5.

The innermost circumferential portion of the wound body 1 has two curved parts 1a and two long side parts 1b connecting the two curved parts 1a to each other, while the curved parts 1a and long side parts 1b define a space S. In the space S, a cross-sectional form of the wound body 1 cut at a plane parallel to its side face (surface having an opening portion of the space S) has a cocoon form as shown in FIG. 1. However, the innermost circumferential portion of the wound body has a step with respect to the winding start portion 1c of the multilayer member 3. The space S can absorb bulges caused by the lead thickness, while holding an electrolytic solution.

Figure 2:
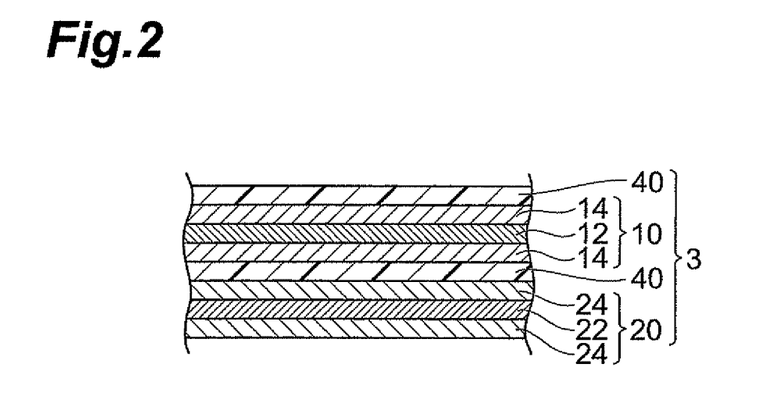
FIG. 2 is a schematic sectional view showing the multilayer structure of a multilayer member constituting the wound body.

FIG. 2 is a schematic sectional view showing the multilayer structure of the multilayer member 3. As shown in FIG. 2, the multilayer member 3 has a structure in which a band-like positive electrode 20, a band-like separator 40, a band-like negative electrode 10, and a band-like separator 40 are laminated in this order. The positive electrode 20 has a structure in which positive electrode active material layers 24 are laminated on both sides of a positive electrode current collector 22, while the negative electrode 10 has a structure in which negative electrode active material layers 14 are laminated on both sides of a negative electrode current collector 12. In this embodiment, the multilayer member 3 is wound such that the positive electrode 20 is located on the center side of the wound body 1.

In the wound body 1, positive and negative electrode leads are electrically connected to the positive and negative electrode current collectors 22, 12, respectively. The wound body 1 having the structure mentioned above is accommodated in an outer package together with the electrolytic solution, and the positive and negative electrode leads are sealed while extending to the outside of the outer package, whereby a wound electrochemical device is formed.

The wound body 1 has a length L in a longer axis direction (i.e., a longer axis direction in a cocoon-shaped cross section obtained when the wound body 1 is cut along a plane parallel to its side face) of about 16 to 18 mm, a length H in a shorter axis direction (i.e., a direction perpendicular to the longer axis direction) of about 1.0 to 1.3 mm, and a width W of about 13.5 to 15.0 mm. The space S formed at the center of the wound body 1 has a length T in the shorter axis direction of about 0.4 to 0.8 mm.

Figure 3:
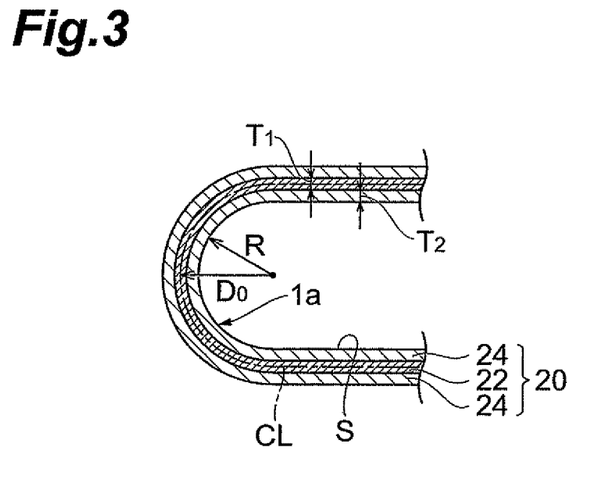
FIG. 3 is a schematic sectional view showing the structure of a main portion of an electrode positioned at the innermost circumference in the wound body.

FIG. 3 is a schematic sectional view showing the structure of a main portion of the electrode (positive electrode 20) positioned at the innermost circumference in the wound body 1. As shown in FIG. 3, the smallest radius of curvature R of the curved part 1a in the innermost circumferential portion of the wound body 1 in the wound electrochemical device is required to satisfy the following expression (1):

$$R = \alpha \times (T_1 + 2T_2) \qquad (1)$$

where R is the smallest radius of curvature of the curved part in the innermost circumferential portion of the wound body (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

While the innermost circumferential portion of the wound body 1 has two curved parts 1a, R is the smallest value in the two curved parts 1a. In the wound body 1 such as the one shown in FIG. 1, the radius of curvature of the first curved part 1a (on the left side in the drawing) from the winding start portion 1c of the multilayer member 3 becomes the smallest radius of curvature R in general. In the case where the radius of curvature fluctuates within one curved part 1a, the smallest value becomes the smallest radius of curvature R.

Whether or not R satisfies the condition represented by the above-mentioned expression (1) can be determined by measuring values of R, $T_1$, and $T_2$ of the wound electrochemical device, inputting these values to the above-mentioned expression (1), and determining whether or not the resulting value of α falls within the range of 3.33 to 7.12. When the computed value of α is less than 3.33, the active material layer is likely to chip, fracture, drop, and so forth, thereby lowering the capacity. When the value of α exceeds 7.12, on the other hand, it becomes difficult for the curved parts 1a to secure the strength of the wound body 1, so that the wound body 1 as a whole is likely to be distorted, while inward distortions increase, whereby a flat form is harder to attain. From the viewpoint of more fully restraining such problems from occurring, the computed value of α preferably falls within the range of 3.50 to 7.00, more preferably 3.60 to 6.80.

The value of $T_2$ is 8 to 30 (unit: μm) as mentioned above. When this value is less than 8, uncoated portions may occur remarkably in the active material layers, thereby causing pinholes and the like, thus deteriorating electrode characteristics. When the value exceeds 30, the capacity may remarkably be lowered by chipping and the like at the time of cutting the electrodes. From the viewpoint of more fully restraining such problems from occurring, the value of $T_2$ is preferably 10 to 25.

Though not restricted in particular as long as the condition of the above-mentioned expression (1) is satisfied, the value of $T_1$ is preferably 15 to 40, more preferably 20 to 30, from the viewpoints of suppressing distortions, restraining the electrodes from chipping and fracturing, improving the volume capacity, and so forth.

The range of value of R is determined by the values of α, $T_1$, and $T_2$ mentioned above.

Figure 4:
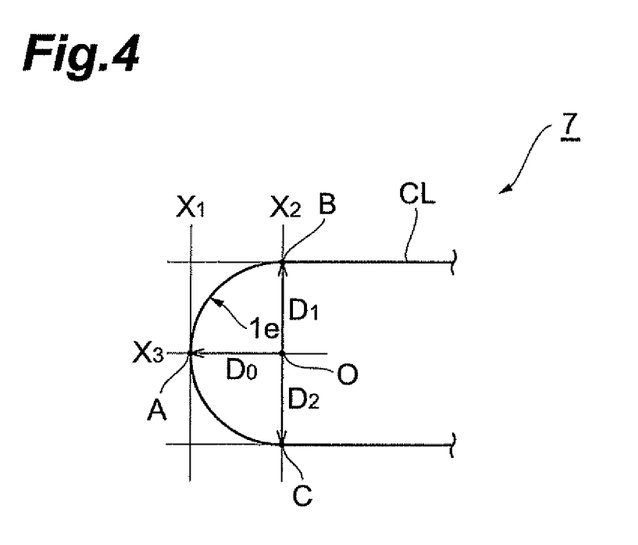
FIG. 4 is a view showing a main portion of a cocoon form drawn by a center line of a current collector in a cross section of the main portion of the wound body shown in FIG. 3.

Preferably, the wound body 1 in the wound electrochemical device has a form satisfying the following conditions. FIG. 4 is a view showing a main portion of a cocoon form 7 drawn by a center line CL of the current collector (positive electrode current collector 22) in a cross section of the main portion of the wound body 1 shown in FIG. 3. As shown in FIG. 4, letting a point A be a contact point between a first line $X_1$ parallel to the shorter axis direction of the wound body 1 and a curved part 1e in the cocoon form 7; assuming that a second line $X_2$ is a line parallel and closest to the first line $X_1$ while intersecting the cocoon form 7 by two points on the first line $X_1$ side of the winding start portion 1c of the wound body 1 and yielding the longest distance between the two points, and letting points B and C be the two intersections between the second line $X_2$ and the cocoon form 7; letting a point O be an intersection between the second line $X_2$ and a line $X_3$ passing the point A while being perpendicular to the first line $X_1$; letting $D_0$ be the distance OA (unit: μm); letting $D_1$ be the distance OB (unit: μm); and letting $D_2$ be the distance OC (unit: μm); each of values ($D_0$-$D_1$) and ($D_0$-$D_2$) is preferably within ±5 μm. While the wound body 1 has two curved parts 1a, it will be preferred if both of them satisfy the above-mentioned condition. When the wound body 1 has a form satisfying the above-mentioned condition, it can more fully restrain the electrodes from fracturing and chipping, so as to attain a higher capacity and more fully suppress the occurrence of distortions. As the values of ($D_0$-$D_1$) and ($D_0$-$D_2$) are closer to 0, the form of the curved part 1a approaches a semicircular form, which is more preferred.

Figure 5:
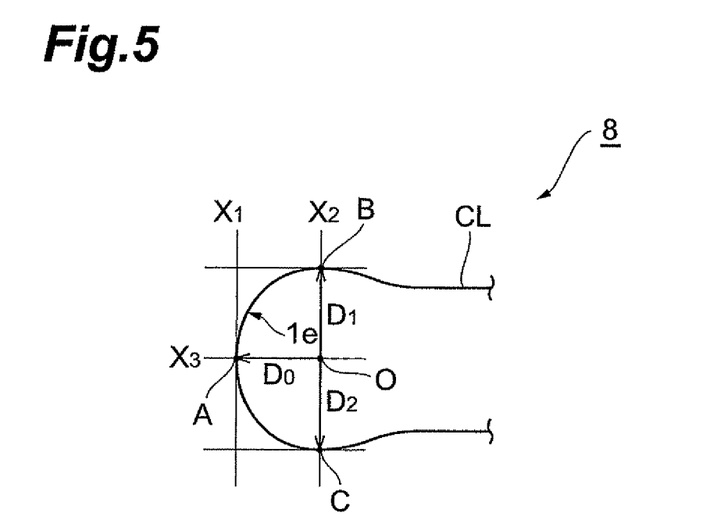
FIG. 5 is a view showing a main portion of another cocoon form drawn by the center line of the current collector in the cross section of the wound body.
Figure 6:
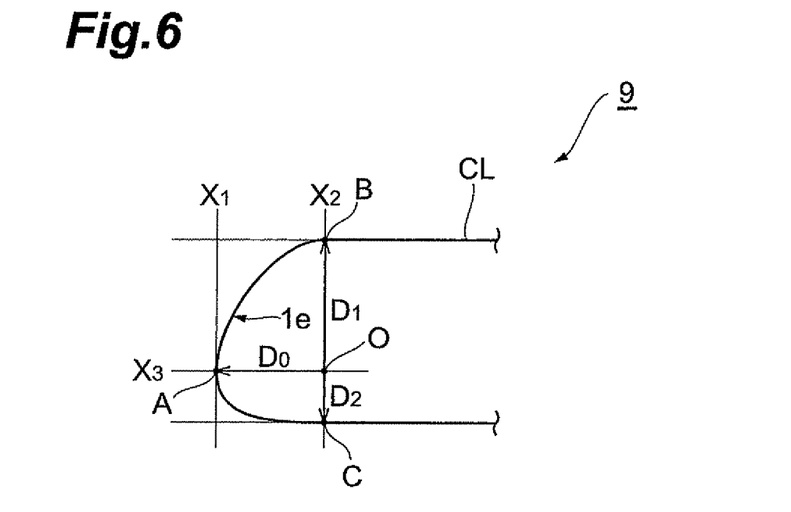
FIG. 6 is a view showing a main portion of still another cocoon form drawn by the center line of the current collector in the cross section of the wound body.

FIGS. 5 and 6 are views showing main portions of other cocoon forms 8, 9 each drawn by the center line CL of the current collector in the cross section of another wound body. As shown in FIG. 5, the cocoon form may be such that the center portion of a longer side part 1b at the innermost circumference of the wound body 1 is depressed toward the center of the wound body 1. As shown in FIG. 6, the radius of curvature of the cocoon form may vary within the curved part 1e. In the case of the cocoon form shown in FIG. 6, however, the smallest radius of curvature R is hard to satisfy the condition represented by the above-mentioned expression (1), while the values ($D_0$-$D_1$) and ($D_0$-$D_2$) are less likely to fall within ±5 μm. Therefore, the forms shown in FIGS. 4 and 5 are preferred.

Constituents of the wound electrochemical device in accordance with the present invention will now be explained with reference to a case where the electrochemical device is a lithium ion secondary battery by way of example.

Employable as the positive electrode current collector 22 and negative electrode current collector 12 are current collectors used in known electrochemical devices, examples of which include copper, aluminum, nickel, and the like shaped into band-like forms.

The positive electrode active material layer 24 is a layer containing a positive electrode active material (cathode active material), a conductive auxiliary agent, a binder, and the like. The cathode active material is not restricted in particular as long as it allows occlusion and release of lithium ions, desorption and insertion of lithium ions (intercalation), or doping and undoping of lithium ions and counter anions of the lithium ions (such as $PF_6^-$) to proceed reversibly; known electrode active materials can be used therefor. Examples of the cathode active material include lithium cobaltate ($LiCoO_2$), lithium nickelate ($LiNiO_2$), lithium manganese spinel ($LiMn_2O_4$), and mixed metal oxides such as those expressed by the general formula of $LiNi_xCo_yMn_zM_aO_2$ (where x+y+z+a=1, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and lithium titanate ($Li_4Ti_5O_{12}$).

The conductive auxiliary agent is not restricted in particular as long as it improves the electrical conductivity of the positive electrode active material layer 24; known conductive auxiliary agents can be used therefor. Examples of the conductive auxiliary agent include carbon blacks, carbon materials, fine powders of metals such as copper, nickel, stainless steel, and iron, mixtures of carbon materials and fine powders of metals, and conductive oxides such as ITO.

The binder is not restricted in particular as long as it can bind particles of the positive electrode active material and particles of the conductive auxiliary agent to the positive electrode current collector 22; known binders can be used therefor. Examples of the binder include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PEA), ethylene/tetrafluoroethylene copolymers (ETE), polychlorotrifluoroethylene (PCTFE), ethylene/chlorotrifluoroethylene copolymers (ECTFE), and polyvinyl fluoride (PVF), and styrene/butadiene rubber (SBR).

The negative electrode active material layer 14 is a layer containing a negative electrode active material (anode active material), a conductive auxiliary agent, a binder, and the like. The anode active material is not restricted in particular as long as it allows occlusion and release of lithium ions, desorption and insertion of lithium ions (intercalation), or doping and undoping of lithium ions and counter anions of the lithium ions (such as $PF_6^-$) to proceed reversibly; known anode active materials can be used therefor. Examples of the anode active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_x$, $SiO_2$, and $SnO_2$; lithium titanate ($Li_4Ti_5O_{12}$); and $TiO_2$. Preferred among them are carbon materials. More preferred are carbon materials having an interlayer distance $d_{02}$ of 0.335 to 0.338 nm and a crystallite size $Lc_{002}$ of 30 to 120 nm. Examples of carbon materials that satisfy such a condition include synthetic graphite, MCF (mesocarbon fiber), and MCMB (mesocarbon microbeads). The above-mentioned interlayer distance $d_{002}$ and crystallite size $Lc_{002}$ can be determined by X-ray diffraction.

The same materials as those constituting the positive electrode active material layer 24 can be used as the constituents other than the negative electrode active material contained in the negative electrode active material layer 14.

As the separators 40, those formed from an electrically insulating porous body can be used, for example. Examples of the electrically insulating porous body include single-layer or multilayer films made of polyethylene, polypropylene, or a polyolefin, drawn films of resin mixtures, and fiber nonwoven cloth composed of at least one kind of constituent material selected from the group consisting of cellulose, polyester, and polypropylene.

As the separators 40, those having a two-dimensional size which is a bit larger than that of the positive electrode 20 and negative electrode 10 are preferably used from the viewpoint of preventing short-circuiting. It will be preferred if the separators 40 stick out of the positive electrode 20 and negative electrode 10 at side faces when forming the multilayer member 3. The thickness of each separator 40 is about 15 to 30 μm.

As the winding stop tape, known ones can be used without any restrictions in particular. Its thickness is about 50 μm.

The electrolytic solution is contained not only in the inner space of the outer package, the space S of the wound body 1, and the like, but also within the positive electrode active layers 24, the negative electrode active material layers 14, and the pores of the separators 40. The electrolytic solution is not restricted in particular; any electrolytic solution (an aqueous electrolytic solution or an electrolytic solution using an organic solvent) employed in known lithium-ion secondary batteries while containing a lithium salt can be used therefor. Since the endurable voltage of the aqueous electrolytic solution at the time of charging is restricted to a low level because of its electrochemically low decomposition voltage, however, the electrolytic solution is preferably one using an organic solvent (i.e., nonaqueous electrolytic solution). Preferably used as the electrolytic solution of a secondary battery is one in which a lithium salt is dissolved in a nonaqueous solvent (organic solvent). Examples of the lithium salt includes $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, LiN($CF_3SO_2$)($C_4F_9SO_2$), and $LiN(CF_3CF_2CO)_2$. These salts may be used singly or in combinations of two or more species.

As the organic solvent, any solvent used in known secondary batteries can be employed. Preferred examples include propylene carbonate, ethylene carbonate, and diethyl carbonate. They may be used singly, or two or more species may be used as a mixture in any proportions.

In the present invention, the electrolyte is not limited to liquids, but may be a gelled electrolyte obtained by adding a gelling agent thereto. A solid electrolyte (a solid polymer electrolyte or an electrolyte composed of an ion-conductive inorganic material) may be used in place of the electrolytic solution.

The outer package is not restricted in particular as long as it can hermetically seal the wound body 1 therein and prevent air and moisture from entering the inside thereof; cases used in known secondary batteries can be employed therefor. For example, synthetic resins such as epoxy resin and resin-laminated metal sheets made of aluminum and the like can be used.

The positive and negative electrode leads are formed from a conductor material such as a metal. Examples of the conductor material include copper and nickel. The positive and negative electrode leads extend from within the outer package to the outside thereof while intersecting a sealed part thereof. The positive and negative electrode leads are separated from each other in a direction orthogonal to the shorter axis direction of the wound body 1. The positive and negative electrode leads are covered with an insulator where they are held with the seal part of the outer package, while the insulator and the outer package are joined to each other at the seal part.

Method of Manufacturing Wound Electrochemical Device

The method of manufacturing a wound electrochemical device in accordance with the present invention comprises a multilayer member preparing step of preparing a multilayer member including a multilayer structure composed of a positive electrode, a separator, and a negative electrode; and a winding step of winding the multilayer member about a core material having a cross section in a cocoon form, so as to form a flat wound body; wherein the smallest radius of curvature $R_0$ in a curved part in the cocoon form in the core material satisfies the following expression (2):

$$R_0 = \alpha \times (T_1 + 2T_2) \quad (2)$$

where $R_0$ is the smallest radius of curvature of the curved part in the cocoon form (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

In the above-mentioned multilayer member preparing step, the band-like positive electrode current collector 22 is prepared, and the positive electrode active material layer coating liquid is applied to and dried on both sides of the positive electrode current collector 22, so as to form the positive electrode active material layers 24 on both sides, whereby the band-like positive electrode 20 is obtained. Similarly, the band-like negative electrode current collector 12 is prepared, and the negative electrode active material layer coating liquid is applied to and dried on both sides of the negative electrode current collector 12, so as to form the negative electrode active material layers 14 on both sides, whereby the band-like negative electrode 10 is obtained.

The technique for coating the current collectors with the respective coating liquids is not restricted in particular but may be determined appropriately according to materials, forms, and the like of metal sheets used for the current collectors. Examples of the technique include metal mask printing, electrostatic coating, dip coating, spray coating, roll coating, doctor blading, gravure coating, and screen printing. Thereafter, the coated layers are extended by a platen press, calender rolls, or the like if necessary.

Next, the positive electrode 20, separator 40, negative electrode 10, and separator 40 are laminated in this order, so as to form the band-like multilayer member 3. The multilayer member 3 may be subjected to heat pressing or the like in its laminating direction if necessary.

Figure 7:
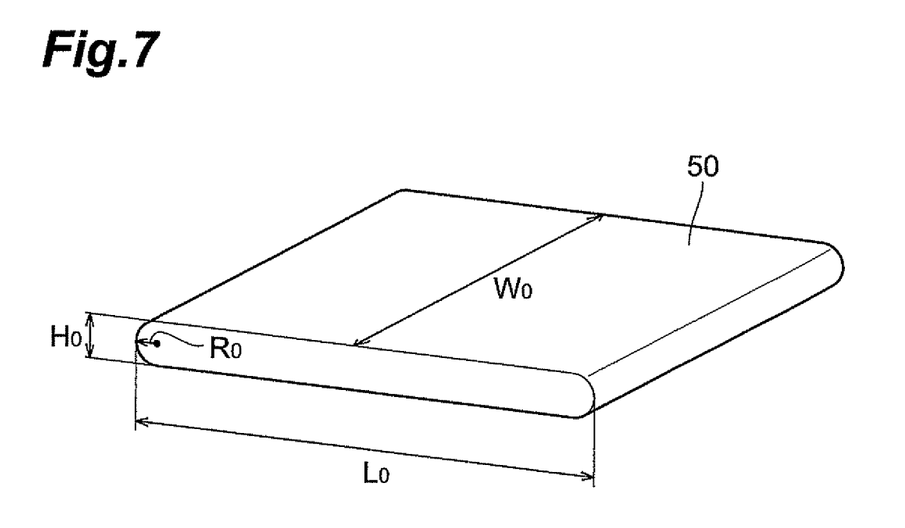
FIG. 7 is a perspective view showing a preferred embodiment of a core material used in a winding step.

Subsequently, the winding step is performed. FIG. 7 is a perspective view showing a preferred embodiment of a core material used in the winding step. As shown in FIG. 7, the core material 50 has a cross section in a cocoon form, in which the smallest radius of curvature $R_0$ in a curved part satisfies the condition mentioned above. When a core material having such a form is used, the above-mentioned wound body 1 in the wound electrochemical device in accordance with the present invention can be made efficiently and securely.

The smallest radius of curvature R in the curved part in the wound body 1 substantially coincides with the smallest radius of curvature $R_0$ in the curved part in the core material 50. Even under the influence of bulges and the like due to the thickness of leads and impregnation with the electrolytic solution, the resulting wound body I will satisfy the condition of the above-mentioned expression (1) if the core material 50 satisfying the condition of the above-mentioned expression (2) is used. The value of $\alpha$ in the above-mentioned expression (2) preferably falls within the range of 3.50 to 7.00, more preferably 3.60 to 6.80, as in the case of the above-mentioned expression (1).

The core material 50 has a length $L_0$ in the longer axis direction of about 14 to 17 mm, a length $H_0$ in the shorter axis direction of about 0.4 to 0.8 mm, and a width $W_0$ of about 15 to 30 mm.

After winding the multilayer member 3 about the core material 50, the core material 50 is pulled out, whereby the wound body 1 having the space S at the center can be obtained. The space S can absorb the bulge caused by the thickness of leads, while holding the electrolytic solution. In the wound body 1 formed by using the above-mentioned core material 50, the form of the space S is inevitably determined by that of the core material 50.

The positive and negative electrode leads can be connected to the positive and negative electrode current collectors 22, 12, respectively, by known methods.

After being made, the wound body 1 is accommodated in the outer package having an opening part. Subsequently, the electrolytic solution is injected into the outer package within a vacuum vessel, so that the wound body 1 is dipped in the electrolytic solution. Then, the positive and negative electrode leads are arranged so as to extend from within the outer package to the outside thereof while intersecting the opening part. Thereafter, the seal part of the outer package is heat-sealed with a heat sealer. Here, the positive and negative electrode leads are heat-sealed while their insulators are held with the opening part. The heat sealing is preferably done under reduced pressure, e.g., within a vacuum vessel. This completes the making of the electrochemical device.

Though a preferred embodiment of the present invention is explained in detail in the foregoing, the present invention is not limited to the above-mentioned embodiment.

For example, though the above-mentioned embodiment relates to a case where the wound electrochemical device is a lithium-ion secondary battery, the wound electrochemical device of the present invention is not limited thereto but may be any of secondary batteries other than the lithium-ion secondary battery, e.g., a metal lithium secondary battery, electrochemical capacitors such as electric double-layer capacitors, pseudo-capacitance capacitors, pseudo-capacitors, and redox capacitors, and the like. In the case of the electrochemical devices other than the lithium-ion secondary battery, electrode active materials suitable for the electrochemical devices may be used. In the case of the electric double-layer capacitors, for example, acetylene black, graphite, activated carbon, and the like are used as active materials contained in the cathode and anode active material containing layers. Examples of the electrolytic solution for use include solutions of quaternary ammonium salts such as tetraethylammonium tetrafluoroborate in organic solvents such as propylene carbonate, diethylene carbonate, and acetonitrile.

The wound electrochemical device of the present invention is also usable for a power supply for a self-propelled micromachine, an IC card, or the like and a dispersed power supply located on or in a printed circuit board.

EXAMPLES

The present invention will now be explained more specifically with reference to examples and comparative examples, but is not limited to the following examples.

Example 1

Making of Electrodes

An active material layer coating liquid was prepared by mixing 87% by mass of granular activated carbon (product name: RP-20 manufactured by Kuraray Chemical Co., Ltd.), 3% by mass of acetylene black, and 10% by mass of polyvinylidene fluoride as a binder, and kneading the resulting mixture with N-methylpyrrolidone as a solvent. On the other hand, a lead made of an aluminum foil (having a thickness of 100 μm) was electrically connected to a band-like aluminum foil (having a thickness of 20 μm) by ultrasonic welding. Subsequently, the active material layer coating liquid was applied to both sides of the aluminum foil (having a thickness of 20 μm) by doctor blading and then dried, so as to form active material layers (each having a thickness of 8 μm). Thus, band-like electrodes (positive and negative electrodes) in which the active material layers each having a thickness of 8 μm were laminated on both sides of the current collector having a thickness of 20 μm were obtained.

Making of Multilayer Member

The band-like electrode (positive electrode), a band-like separator (nonwoven cloth made of regenerated cellulose), the band-like electrode (negative electrode), and a band-like separator (nonwoven cloth made of regenerated cellulose) were laminated in this order as shown in FIG. 2, and pressed under a pressure of 1 kg/cm$^2$ while being heated at 180° C. for 10 sec, whereby a band-like multilayer member was obtained. Here, as the band-like separators, those having a size which is a bit larger than that of the band-like positive and negative electrodes were used and laminated such that the separators slightly stuck out of the positive and negative electrodes at side faces of the multilayer member. Specifically, the positive electrode was 13 mm×50 mm, the negative electrode was 13 mm×50 mm, and each separator was 15 mm×52 mm.

Making of Wound Body

A core material having a cross section in a cocoon form such as the one shown in FIG. 7 was prepared. Used as the core material was one in which the smallest radius of curvature $R_0$ in a curved part in the cocoon form was 119.88 μm. The above-mentioned multilayer member was wound about the core material by about two and a half rounds while locating the positive electrode on the core material side as shown in FIG. 1. Subsequently, the winding end portion was held with a winding stop tape, and the core material was pulled out, whereby the wound body was obtained.

Making of Electric Double-Layer Capacitor

The above-mentioned wound body was put into an outer package made of an aluminum laminate film, an electrolytic solution (a propylene carbonate solution containing 1.0 mol/L of tetraethylammonium tetrafluoroborate) was injected therein, and the outer package was sealed in vacuum. Thus, a wound electric double-layer capacitor was obtained.

In thus obtained wound electric double-layer capacitor, the smallest radius of curvature R of a curved part in the innermost circumferential portion of the wound body was the same as the smallest radius of curvature $R_0$ in the core material. The value of α obtained when inputting the values of R, $T_1$, and $T_2$ in the above-mentioned expression (1) was computed. R will satisfy the condition of the above-mentioned expression (1) if the value of α falls within the range of 3.33 to 7.12. Further, the values of $D_0$, $D_1$, and $D_2$ in the wound body were measured, so as to compute the values of $(D_0-D_1)$ and $(D_0-D_2)$. Table 1 shows the results. The values listed in Table 1 are those of the curved part yielding the greater absolute values of $(D_0-D_1)$ and $(D_0-D_2)$ in the two curved parts in the wound body.

Examples 2 to 84 and Comparative Examples 1 to 42

Wound electric double-layer capacitors of Examples 2 to 84 and Comparative Examples 1 to 42 were made as with Example 1 except that at least one of the thickness of the current collector, the thickness of the active material layer, and the form of the core material at the time of making the wound body was changed. Tables 1 to 4 show the values of the smallest radius of curvature $R_0$ in the core materials and $D_0$, $D_1$, $D_2$, $(D_0-D_1)$, and $(D_0-D_2)$ in the wound bodies of thus obtained wound electric double-layer capacitors. The smallest radius of curvature R of the curved part in the innermost circumferential portion of the wound body in each of the wound electric double-layer capacitors was the same as the smallest radius of curvature $R_0$ in its corresponding core material.

Measurement of Capacity

Thus obtained electric double-layer capacitors were CV-charged at 3.3 V for 5 min and then CC-discharged at 5 mA from 3 to 2 V, and the resulting discharged capacity was measured. Tables 1 to 4 show the results.

Evaluation of Distortion

As for distortions, the wound electric double-layer capacitors in accordance with Examples and Comparative Examples were made 50 each, and their degrees of parallelism in the longitudinal direction were evaluated such that the case where the number of samples yielding a deviation of ±100 μm or outside thereof was 30 or less was defined as "A", whereas the case where the number exceeded 30 was defined as "B". Tables 1 to 4 show the results.

TABLE 1

|  | $T_1$ [μm] | $T_2$ [μm] | α | $R_0(R)$ [μm] | $D_0$ [μm] | $D_1$ [μm] | $D_0-D_1$ [μm] | $D_2$ [μm] | $D_0-D_2$ [μm] | Capacity [mF] | Distortion |
|---|---|---|---|---|---|---|---|---|---|---|---|
| Comp. Ex. 1 | 20 | 8 | 2.83 | 101.88 | 119.88 | 124.68 | 4.80 | 124.63 | 4.75 | 275.2 | A |
| Example 1 | 20 | 8 | 3.33 | 119.88 | 137.88 | 133.07 | −4.81 | 142.44 | 4.56 | 295.6 | A |
| Example 2 | 20 | 8 | 3.58 | 128.88 | 146.88 | 142.20 | −4.68 | 150.13 | 3.25 | 298.5 | A |
| Example 3 | 20 | 8 | 4.77 | 171.72 | 189.72 | 193.95 | 4.23 | 185.94 | −3.78 | 297.0 | A |
| Example 4 | 20 | 8 | 6.32 | 227.52 | 245.52 | 248.39 | 2.87 | 244.58 | −0.94 | 289.6 | A |
| Example 5 | 20 | 8 | 7.12 | 256.32 | 274.32 | 270.16 | −4.16 | 271.44 | −2.88 | 294.8 | A |
| Comp. Ex. 2 | 20 | 8 | 7.55 | 271.80 | 289.80 | 294.68 | 4.88 | 294.12 | 4.32 | 295.7 | B |
| Comp. Ex. 3 | 20 | 10 | 2.83 | 113.20 | 133.20 | 138.00 | 4.80 | 137.95 | 4.75 | 283.1 | A |
| Example 6 | 20 | 10 | 3.33 | 133.20 | 153.20 | 148.39 | −4.81 | 157.76 | 4.56 | 301.5 | A |
| Example 7 | 20 | 10 | 3.58 | 143.20 | 163.20 | 158.52 | −4.68 | 166.45 | 3.25 | 302.4 | A |
| Example 8 | 20 | 10 | 4.77 | 190.80 | 210.80 | 215.03 | 4.23 | 207.02 | −3.78 | 300.9 | A |
| Example 9 | 20 | 10 | 6.32 | 252.80 | 272.80 | 275.67 | 2.87 | 271.86 | −0.94 | 302.8 | A |
| Example 10 | 20 | 10 | 7.12 | 284.80 | 304.80 | 300.64 | −4.16 | 301.92 | −2.88 | 304.8 | A |
| Comp. Ex. 4 | 20 | 10 | 7.55 | 302.00 | 322.00 | 326.88 | 4.88 | 326.32 | 4.32 | 305.9 | B |
| Comp. Ex. 5 | 20 | 18 | 2.83 | 158.48 | 186.48 | 184.50 | −1.98 | 183.60 | −2.88 | 284.5 | A |
| Example 11 | 20 | 18 | 3.33 | 186.48 | 214.48 | 211.49 | −2.99 | 218.46 | 3.98 | 310.5 | A |
| Example 12 | 20 | 18 | 3.58 | 200.48 | 228.48 | 223.80 | −4.68 | 231.73 | 3.25 | 312.0 | A |
| Example 13 | 20 | 18 | 3.58 | 200.48 | 228.48 | 223.36 | −5.12 | 233.34 | 4.86 | 295.6 | A |
| Example 14 | 20 | 18 | 3.58 | 200.48 | 228.48 | 233.24 | 4.76 | 233.57 | 5.09 | 291.8 | A |
| Example 15 | 20 | 18 | 3.58 | 200.48 | 228.48 | 234.14 | 5.66 | 222.36 | −6.12 | 290.4 | A |
| Example 16 | 20 | 18 | 3.58 | 200.48 | 228.48 | 234.36 | 5.88 | 234.80 | 6.32 | 289.6 | A |
| Example 17 | 20 | 18 | 3.58 | 200.48 | 228.48 | 225.26 | −3.22 | 231.04 | 2.56 | 308.6 | A |
| Example 18 | 20 | 18 | 4.77 | 267.12 | 295.12 | 290.57 | −4.55 | 299.23 | 4.11 | 305.4 | A |
| Example 19 | 20 | 18 | 5.71 | 319.76 | 347.76 | 351.65 | 3.89 | 344.20 | −3.56 | 300.9 | A |
| Example 20 | 20 | 18 | 6.32 | 353.92 | 381.92 | 384.81 | 2.89 | 385.69 | 3.77 | 301.6 | A |
| Example 21 | 20 | 18 | 7.12 | 398.72 | 426.72 | 423.84 | −2.88 | 425.44 | −1.28 | 303.2 | A |
| Comp. Ex. 6 | 20 | 18 | 7.55 | 422.80 | 450.80 | 446.82 | −3.98 | 453.47 | 2.67 | 304.5 | B |

TABLE 2

|  | $T_1$ [μm] | $T_2$ [μm] | α | $R_0(R)$ [μm] | $D_0$ [μm] | $D_1$ [μm] | $D_0-D_1$ [μm] | $D_2$ [μm] | $D_0-D_2$ [μm] | Capacity [mF] | Distortion |
|---|---|---|---|---|---|---|---|---|---|---|---|
| Comp. Ex. 7 | 20 | 20 | 2.83 | 169.80 | 199.80 | 197.25 | −2.55 | 201.49 | 1.69 | 283.6 | A |
| Example 22 | 20 | 20 | 3.33 | 199.80 | 229.80 | 233.69 | 3.89 | 228.93 | −0.87 | 300.5 | A |

TABLE 2-continued

|  | $T_1$ [μm] | $T_2$ [μm] | α | $R_0(R)$ [μm] | $D_0$ [μm] | $D_1$ [μm] | $D_0 - D_1$ [μm] | $D_2$ [μm] | $D_0 - D_2$ [μm] | Capacity [mF] | Distortion |
|---|---|---|---|---|---|---|---|---|---|---|---|
| Example 23 | 20 | 20 | 3.58 | 214.80 | 244.80 | 248.33 | 3.53 | 248.44 | 3.64 | 301.2 | A |
| Example 24 | 20 | 20 | 4.77 | 286.20 | 316.20 | 313.09 | -3.11 | 319.41 | 3.21 | 301.4 | A |
| Example 25 | 20 | 20 | 6.32 | 379.20 | 409.20 | 405.52 | -3.68 | 407.26 | -1.94 | 301.6 | A |
| Example 26 | 20 | 20 | 7.12 | 427.20 | 457.20 | 458.79 | 1.59 | 460.97 | 3.77 | 303.2 | A |
| Comp. Ex. 8 | 20 | 20 | 7.45 | 447.00 | 477.00 | 476.14 | -0.86 | 480.51 | 3.51 | 304.5 | B |
| Comp. Ex. 9 | 20 | 25 | 2.83 | 198.10 | 233.10 | 231.12 | -1.98 | 235.65 | 2.55 | 286.5 | A |
| Example 27 | 20 | 25 | 3.33 | 233.10 | 268.10 | 270.76 | 2.66 | 267.24 | -0.86 | 300.5 | A |
| Example 28 | 20 | 25 | 3.58 | 250.60 | 285.60 | 288.49 | 2.89 | 284.36 | -1.24 | 301.2 | A |
| Example 29 | 20 | 25 | 4.77 | 333.90 | 368.90 | 371.78 | 2.88 | 368.13 | -0.77 | 301.4 | A |
| Example 30 | 20 | 25 | 6.32 | 442.40 | 477.40 | 474.42 | -2.98 | 480.19 | 2.79 | 301.6 | A |
| Example 31 | 20 | 25 | 7.12 | 498.40 | 533.40 | 536.06 | 2.66 | 530.84 | -2.56 | 303.2 | A |
| Comp. Ex. 10 | 20 | 25 | 7.45 | 521.50 | 556.50 | 558.68 | 2.18 | 554.49 | -2.01 | 304.5 | B |
| Comp. Ex. 11 | 20 | 27 | 2.83 | 209.42 | 246.42 | 247.65 | 1.23 | 248.07 | 1.65 | 285.4 | A |
| Example 32 | 20 | 27 | 3.33 | 246.42 | 283.42 | 285.48 | 2.06 | 281.66 | -1.76 | 298.6 | A |
| Example 33 | 20 | 27 | 3.58 | 264.92 | 301.92 | 303.90 | 1.98 | 303.76 | 1.84 | 297.5 | A |
| Example 34 | 20 | 27 | 4.77 | 352.98 | 389.98 | 391.74 | 1.76 | 388.34 | -1.64 | 299.1 | A |
| Example 35 | 20 | 27 | 6.32 | 467.68 | 504.68 | 502.78 | -1.90 | 506.03 | 1.35 | 298.2 | A |
| Example 36 | 20 | 27 | 7.12 | 526.88 | 563.88 | 562.00 | -1.88 | 565.10 | 1.22 | 296.8 | A |
| Comp. Ex. 12 | 20 | 27 | 7.45 | 551.30 | 588.30 | 590.60 | 2.30 | 587.32 | -0.98 | 299.5 | B |
| Comp. Ex. 13 | 20 | 30 | 2.83 | 226.40 | 266.40 | 267.63 | 1.23 | 268.05 | 1.65 | 281.6 | A |
| Example 37 | 20 | 30 | 3.33 | 266.40 | 306.40 | 308.46 | 2.06 | 304.64 | -1.76 | 296.5 | A |
| Example 38 | 20 | 30 | 3.58 | 286.40 | 326.40 | 328.38 | 1.98 | 328.24 | 1.84 | 298.1 | A |
| Example 39 | 20 | 30 | 3.58 | 286.40 | 326.40 | 332.26 | 5.86 | 332.65 | 6.25 | 297.3 | A |
| Example 40 | 20 | 30 | 4.77 | 381.60 | 421.60 | 423.36 | 1.76 | 419.96 | -1.64 | 296.5 | A |
| Example 41 | 20 | 30 | 6.32 | 505.60 | 545.60 | 543.70 | -1.90 | 546.95 | 1.35 | 291.6 | A |
| Example 42 | 20 | 30 | 7.12 | 569.60 | 609.60 | 607.72 | -1.88 | 610.82 | 1.22 | 294.5 | A |
| Comp. Ex. 14 | 20 | 30 | 7.45 | 596.00 | 636.00 | 638.30 | 2.30 | 635.02 | -0.98 | 297.4 | B |

TABLE 3

|  | $T_1$ [μm] | $T_2$ [μm] | α | $R_0(R)$ [μm] | $D_0$ [μm] | $D_1$ [μm] | $D_0 - D_1$ [μm] | $D_2$ [μm] | $D_0 - D_2$ [μm] | Capacity [mF] | Distortion |
|---|---|---|---|---|---|---|---|---|---|---|---|
| Comp. Ex. 15 | 25 | 8 | 2.83 | 116.03 | 136.53 | 135.87 | -0.66 | 140.88 | 4.35 | 263.5 | A |
| Example 43 | 25 | 8 | 3.33 | 136.53 | 157.03 | 160.24 | 3.21 | 154.49 | -2.54 | 295.3 | A |
| Example 44 | 25 | 8 | 4.77 | 195.57 | 216.07 | 220.72 | 4.65 | 220.06 | 3.99 | 294.3 | A |
| Example 45 | 25 | 8 | 7.12 | 291.92 | 312.42 | 315.10 | 2.68 | 314.10 | 1.68 | 297.6 | A |
| Comp. Ex. 16 | 25 | 8 | 7.55 | 309.55 | 330.05 | 333.83 | 3.78 | 329.08 | -0.97 | 289.7 | B |
| Comp. Ex. 17 | 25 | 10 | 2.83 | 127.35 | 149.85 | 147.86 | -1.99 | 150.41 | 0.56 | 275.8 | A |
| Example 46 | 25 | 10 | 3.33 | 149.85 | 172.35 | 168.14 | -4.21 | 168.15 | -4.20 | 301.5 | A |
| Example 47 | 25 | 10 | 4.77 | 214.65 | 237.15 | 233.27 | -3.88 | 238.71 | 1.56 | 302.5 | A |
| Example 48 | 25 | 10 | 7.12 | 320.40 | 342.90 | 339.92 | -2.98 | 346.44 | 3.54 | 302.8 | A |
| Comp. Ex. 18 | 25 | 10 | 7.55 | 339.75 | 362.25 | 364.83 | 2.58 | 365.94 | 3.69 | 306.9 | B |
| Comp. Ex. 19 | 25 | 18 | 2.83 | 172.63 | 203.13 | 199.24 | -3.89 | 200.69 | -2.44 | 285.3 | A |
| Example 49 | 25 | 18 | 3.33 | 203.13 | 233.63 | 230.15 | -3.48 | 235.69 | 2.06 | 300.1 | A |
| Example 50 | 25 | 18 | 4.77 | 290.97 | 321.47 | 325.35 | 3.88 | 318.35 | -3.12 | 300.4 | A |
| Example 51 | 25 | 18 | 7.12 | 434.32 | 464.82 | 468.51 | 3.69 | 461.76 | -3.06 | 300.8 | A |
| Comp. Ex. 20 | 25 | 18 | 7.55 | 460.55 | 491.05 | 487.26 | -3.79 | 494.71 | 3.66 | 301.2 | B |
| Comp. Ex. 21 | 25 | 20 | 2.95 | 191.75 | 224.25 | 226.88 | 2.63 | 220.80 | -3.45 | 284.8 | A |
| Example 52 | 25 | 20 | 3.33 | 216.45 | 248.95 | 247.97 | -0.98 | 251.12 | 2.17 | 331.1 | A |
| Example 53 | 25 | 20 | 4.77 | 310.05 | 342.55 | 345.11 | 2.56 | 345.97 | 3.42 | 330.2 | A |
| Example 54 | 25 | 20 | 7.12 | 462.80 | 495.30 | 490.64 | -4.66 | 499.81 | 4.51 | 330.0 | A |
| Comp. Ex. 22 | 25 | 20 | 7.55 | 490.75 | 523.25 | 527.78 | 4.53 | 519.03 | -4.22 | 331.2 | B |
| Comp. Ex. 23 | 25 | 25 | 2.95 | 221.25 | 258.75 | 262.62 | 3.87 | 259.73 | 0.98 | 282.3 | A |
| Example 55 | 25 | 25 | 3.33 | 249.75 | 287.25 | 290.37 | 3.12 | 287.52 | 0.27 | 331.1 | A |
| Example 56 | 25 | 25 | 4.77 | 357.75 | 395.25 | 392.84 | -2.41 | 397.71 | 2.46 | 330.2 | A |
| Example 57 | 25 | 25 | 7.12 | 534.00 | 571.50 | 573.18 | 1.68 | 570.62 | -0.88 | 330.0 | A |
| Comp. Ex. 24 | 25 | 25 | 7.55 | 566.25 | 603.75 | 605.30 | 1.55 | 602.81 | -0.94 | 331.2 | B |
| Comp. Ex. 25 | 25 | 27 | 2.95 | 233.05 | 272.55 | 271.87 | -0.68 | 275.42 | 2.87 | 279.3 | A |
| Example 58 | 25 | 27 | 3.33 | 263.07 | 302.57 | 305.22 | 2.65 | 304.92 | 2.35 | 298.6 | A |
| Example 59 | 25 | 27 | 4.77 | 376.83 | 416.33 | 416.66 | 0.33 | 413.37 | -2.96 | 299.1 | A |
| Example 60 | 25 | 27 | 7.12 | 562.48 | 601.98 | 599.39 | -2.59 | 599.30 | -2.68 | 298.7 | A |
| Comp. Ex. 26 | 25 | 27 | 7.55 | 596.45 | 635.95 | 638.94 | 2.99 | 638.39 | 2.44 | 298.5 | B |
| Comp. Ex. 27 | 25 | 30 | 2.83 | 240.55 | 283.05 | 284.71 | 1.66 | 284.70 | 1.65 | 268.4 | A |
| Example 61 | 25 | 30 | 3.33 | 283.05 | 325.55 | 324.35 | -1.20 | 326.13 | 0.58 | 296.5 | A |
| Example 62 | 25 | 30 | 4.77 | 405.45 | 447.95 | 446.32 | -1.63 | 446.58 | -1.37 | 294.6 | A |
| Example 63 | 25 | 30 | 7.12 | 605.20 | 647.70 | 649.39 | 1.69 | 645.25 | -2.45 | 295.4 | A |
| Comp. Ex. 28 | 25 | 30 | 7.63 | 648.55 | 691.05 | 692.04 | 0.99 | 692.14 | 1.09 | 294.3 | B |

TABLE 4

| | $T_1$ [μm] | $T_2$ [μm] | α | $R_0$(R) [μm] | $D_0$ [μm] | $D_1$ [μm] | $D_0 - D_1$ [μm] | $D_2$ [μm] | $D_0 - D_2$ [μm] | Capacity [mF] | Distortion |
|---|---|---|---|---|---|---|---|---|---|---|---|
| Comp. Ex. 29 | 30 | 8 | 2.83 | 130.18 | 153.18 | 157.74 | 4.56 | 149.62 | −3.56 | 255.9 | A |
| Example 64 | 30 | 8 | 3.58 | 164.68 | 187.68 | 190.93 | 3.25 | 184.35 | −3.33 | 292.1 | A |
| Example 65 | 30 | 8 | 4.31 | 198.26 | 221.26 | 217.08 | −4.18 | 225.38 | 4.12 | 296.4 | A |
| Example 66 | 30 | 8 | 7.12 | 327.52 | 350.52 | 354.49 | 3.97 | 346.85 | −3.67 | 297.9 | A |
| Comp. Ex. 30 | 30 | 8 | 7.55 | 347.30 | 370.30 | 374.36 | 4.06 | 367.08 | −3.22 | 287.9 | B |
| Comp. Ex. 31 | 30 | 10 | 2.83 | 141.50 | 166.50 | 168.48 | 1.98 | 169.16 | 2.66 | 278.3 | A |
| Example 67 | 30 | 10 | 3.33 | 166.50 | 191.50 | 187.62 | −3.88 | 189.34 | −2.16 | 301.5 | A |
| Example 68 | 30 | 10 | 4.77 | 238.50 | 263.50 | 260.64 | −2.86 | 260.94 | −2.56 | 302.8 | A |
| Example 69 | 30 | 10 | 7.12 | 356.00 | 381.00 | 379.03 | −1.97 | 382.18 | 1.18 | 302.7 | A |
| Comp. Ex. 32 | 30 | 10 | 7.55 | 377.50 | 402.50 | 406.85 | 4.35 | 404.19 | 1.69 | 307.7 | B |
| Comp. Ex. 33 | 30 | 18 | 2.83 | 186.78 | 219.78 | 215.09 | −4.69 | 215.77 | −4.01 | 284.5 | A |
| Example 70 | 30 | 18 | 3.33 | 219.78 | 252.78 | 251.79 | −0.99 | 256.87 | 4.09 | 300.3 | A |
| Example 71 | 30 | 18 | 4.77 | 314.82 | 347.82 | 351.84 | 4.02 | 344.13 | −3.69 | 301.4 | A |
| Example 72 | 30 | 18 | 7.12 | 469.92 | 502.92 | 504.90 | 1.98 | 506.04 | 3.12 | 306.4 | A |
| Comp. Ex. 34 | 30 | 18 | 7.55 | 498.30 | 531.30 | 526.74 | −4.56 | 535.07 | 3.77 | 304.7 | B |
| Comp. Ex. 35 | 30 | 20 | 2.95 | 206.50 | 241.50 | 244.38 | 2.88 | 245.70 | 4.20 | 284.5 | A |
| Example 73 | 30 | 20 | 3.33 | 233.10 | 268.10 | 270.14 | 2.04 | 265.93 | −2.17 | 326.9 | A |
| Example 74 | 30 | 20 | 4.31 | 301.70 | 336.70 | 339.49 | 2.79 | 334.48 | −2.22 | 332.7 | A |
| Example 75 | 30 | 20 | 7.12 | 498.40 | 533.40 | 529.34 | −4.06 | 532.41 | −0.99 | 331.9 | A |
| Comp. Ex. 36 | 30 | 20 | 7.55 | 528.50 | 563.50 | 559.53 | −3.97 | 560.82 | −2.68 | 326.7 | B |
| Comp. Ex. 37 | 30 | 25 | 2.95 | 236.00 | 276.00 | 279.75 | 3.75 | 276.88 | 0.88 | 280.6 | A |
| Example 76 | 30 | 25 | 3.33 | 266.40 | 306.40 | 308.94 | 2.54 | 307.05 | 0.65 | 329.4 | A |
| Example 77 | 30 | 25 | 4.77 | 381.60 | 421.60 | 419.26 | −2.34 | 423.08 | 1.48 | 328.7 | A |
| Example 78 | 30 | 25 | 7.12 | 569.60 | 609.60 | 611.68 | 2.08 | 607.05 | −2.55 | 327.9 | A |
| Comp. Ex. 38 | 30 | 25 | 7.55 | 604.00 | 644.00 | 648.55 | 4.55 | 647.14 | 3.14 | 330.1 | B |
| Comp. Ex. 39 | 30 | 27 | 2.95 | 247.80 | 289.80 | 289.12 | −0.68 | 288.26 | −1.54 | 272.3 | A |
| Example 79 | 30 | 27 | 3.33 | 279.72 | 321.72 | 324.25 | 2.53 | 323.81 | 2.09 | 297.3 | A |
| Example 80 | 30 | 27 | 4.77 | 400.68 | 442.68 | 441.32 | −1.36 | 444.69 | 2.01 | 298.6 | A |
| Example 81 | 30 | 27 | 7.12 | 598.08 | 640.08 | 642.64 | 2.56 | 637.54 | −2.54 | 298.3 | A |
| Comp. Ex. 40 | 30 | 27 | 7.55 | 634.20 | 676.20 | 673.31 | −2.89 | 674.24 | −1.96 | 297.8 | B |
| Comp. Ex. 41 | 30 | 30 | 2.83 | 254.70 | 299.70 | 301.02 | 1.32 | 302.48 | 2.78 | 265.7 | A |
| Example 82 | 30 | 30 | 3.33 | 299.70 | 344.70 | 345.79 | 1.09 | 343.72 | −0.98 | 289.6 | A |
| Example 83 | 30 | 30 | 4.77 | 429.30 | 474.30 | 473.19 | −1.11 | 476.68 | 2.38 | 292.3 | A |
| Example 84 | 30 | 30 | 7.12 | 640.80 | 685.80 | 684.71 | −1.09 | 683.35 | −2.45 | 295.8 | A |
| Comp. Ex. 42 | 30 | 30 | 7.63 | 686.70 | 731.70 | 733.34 | 1.64 | 735.77 | 4.07 | 293.7 | B |

What is claimed is:

1. A wound electrochemical device having a flat wound body formed by winding a multilayer member including a multilayer structure composed of a positive electrode, a separator, and a negative electrode;
wherein each of the positive and negative electrodes includes a structure having an active material layer formed on both sides of a current collector;
wherein the wound body has a space at a center portion thereof; and
wherein the smallest radius of curvature R of a curved part in an innermost circumferential portion of the wound body satisfies the following expression (1):

$$R = \alpha \times (T_1 + 2T_2) \quad (1)$$

where R is the smallest radius of curvature of the curved part in the innermost circumferential portion of the wound body (unit: μm), α is a value within the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

2. A wound electrochemical device according to claim 1, wherein, in a cocoon form drawn by a center line of the current collector of the electrode positioned at the innermost circumference of the wound body in a cross section of the wound body cut by a plane parallel to a side face thereof;
letting a point A be a contact point between a first line parallel to a shorter axis direction of the wound body and a curved part in the cocoon form;
assuming that a second line is a line parallel and closest to the first line while intersecting the cocoon form by two points on the first line side of a winding start portion of the wound body and yielding the longest distance between the two points, and letting points B and C be the two intersections between the second line and the cocoon form;
letting a point O be an intersection between the second line and a line passing the point A while being perpendicular to the first line; and
letting $D_0$ be the distance OA (unit: μm), $D_1$ be the distance OB (unit: μm), and $D_2$ be the distance OC (unit: μm);
each of values ($D_0-D_1$) and ($D_0-D_2$) is within 15 μm.

3. A method of manufacturing a wound electrochemical device, the method comprising:
a multilayer member preparing step of preparing a multilayer member including a multilayer structure composed of a positive electrode, a separator, and a negative electrode; and
a winding step of winding the multilayer member about a core material having a cross section in a cocoon form, so as to form a flat wound body;
wherein the smallest radius of curvature $R_0$ in a curved part in the cocoon form in the core material satisfies the following expression (2):

$$R_0 = \alpha \times (T_1 + 2T_2) \quad (2)$$

where $R_0$ is the smallest radius of curvature of the curved part in the cocoon form (unit: μm), α is a value in the range of 3.33 to 7.12, $T_1$ is a thickness of the current collector of the electrode positioned at the innermost circumference of the wound body (unit: μm), and $T_2$ is a thickness of the active material layer of the electrode positioned at the innermost circumference of the wound body (unit: μm), $T_2$ being a value within the range of 8 to 30 (unit: μm).

* * * * *